YL-704. I.R. Spectrum
(In Nujol)

YL-704 A₁ I.R. Spectrum
(In Nujol)

YL-704 A₂ I.R. Spectrum (In Nujol)

FIG. 4. YL-704 B₁ I.R. Spectrum (In Nujol)

FIG.5. YL-704 B₂ I.R. Spectrum (In Nujol)

YL-704 A₁ U.V. Spectrum
(In ethanol)

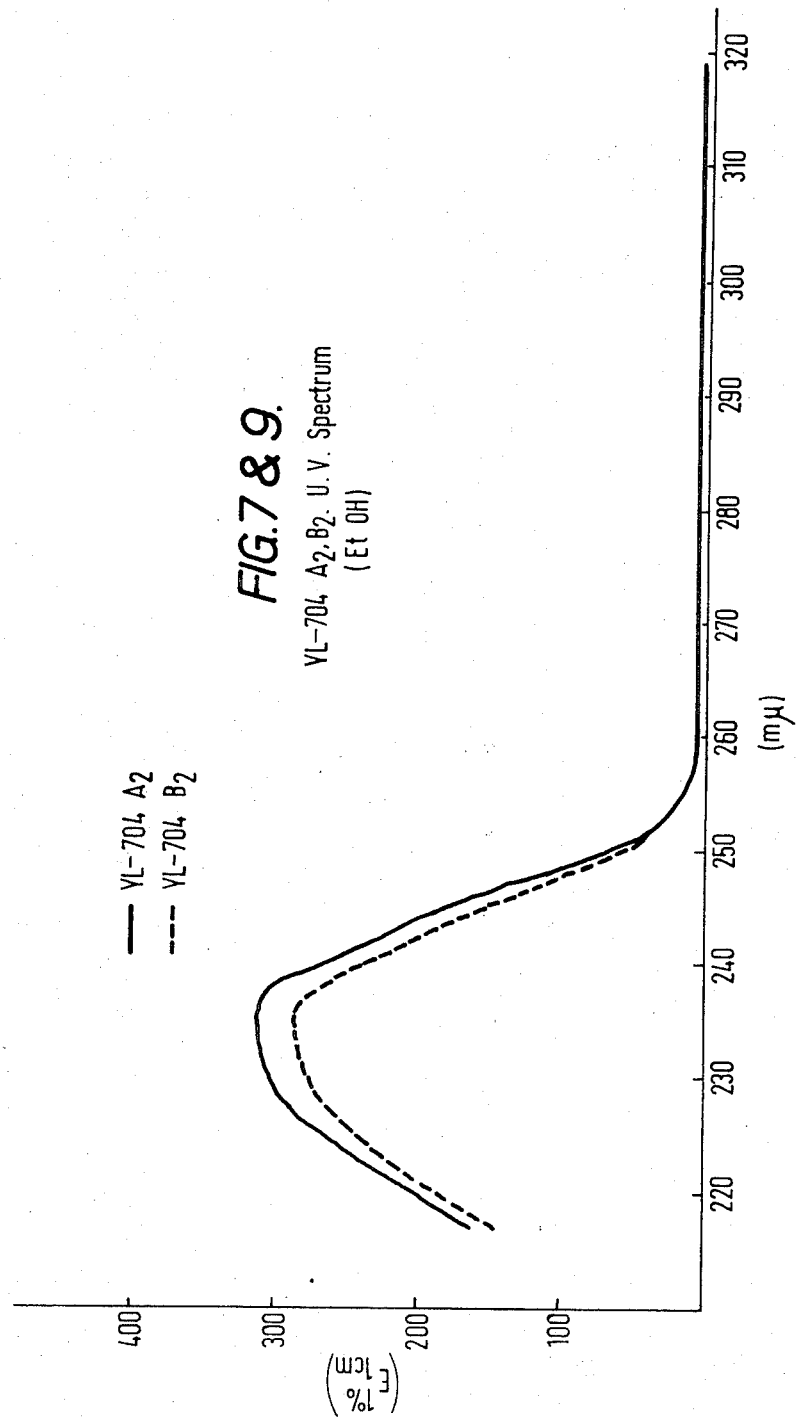

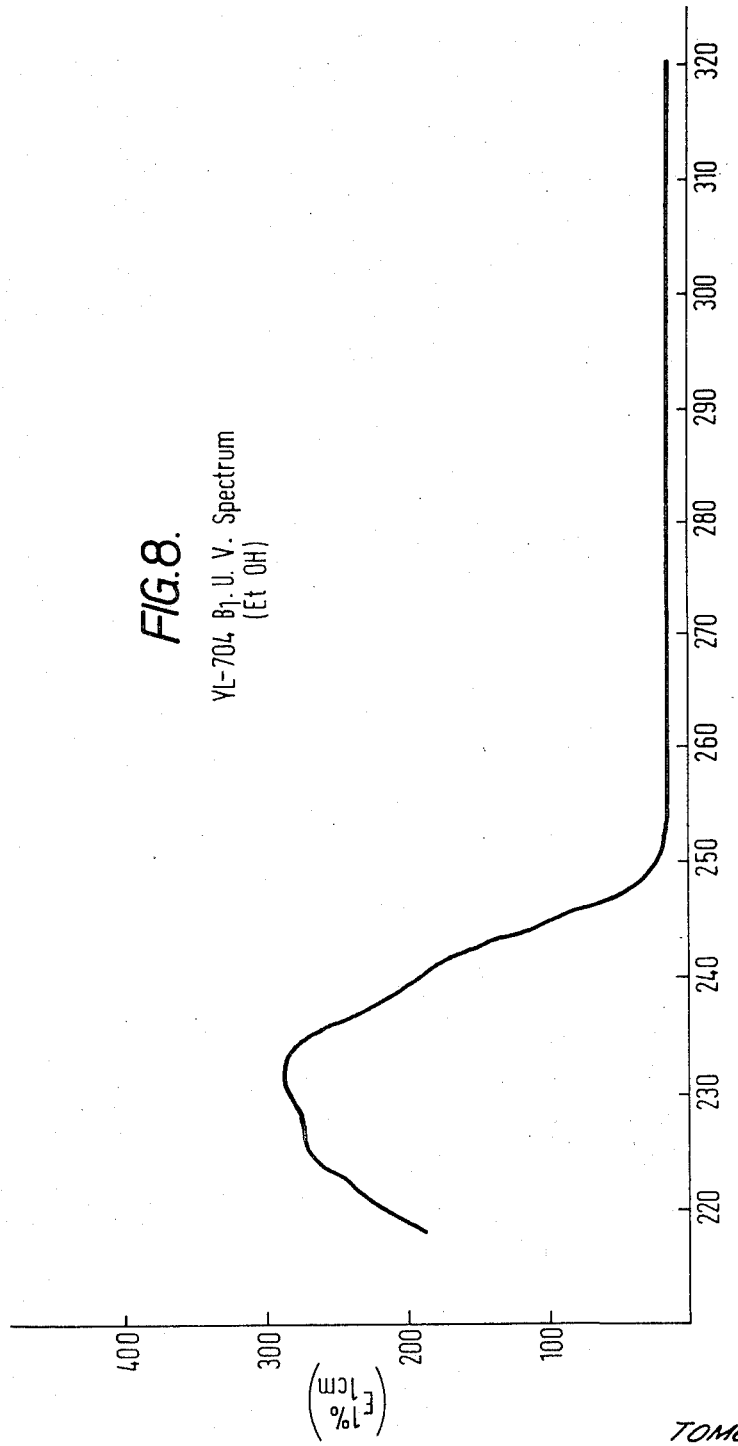

I = YL-704
II = YL-704A   III = YL-704B
IV = THE ANTIBIOTIC COMPOSITION LEUCOMYCIN A
   (a: LEUCOMYCIN A₃ GROUP  b: LEUCOMYCIN A₁ GROUP)
V = LEUCOMYCIN A₁   VI = LEUCOMYCIN A₃

I = YL-704
IV = LEUCOMYCIN A

United States Patent Office 3,718,742
Patented Feb. 27, 1973

3,718,742
ANTIBIOTICS YL 704 AND PREPARATION THEREOF
Tomoharu Okuda and Shigemi Awataguchi, Tokyo, Japan, assignors to Tanabe Seiyaku Co., Ltd., Osaka, Japan
Filed May 13, 1970, Ser. No. 36,989
Claims priority, application Japan, May 19, 1969, 44/38,648
Int. Cl. A61k 21/00; C12d 9/14
U.S. Cl. 424—121
19 Claims

ABSTRACT OF THE DISCLOSURE

A process for producing an antibiotic, which comprises cultivating a YL 704-producing strain of Streptomyces platensis var. sp. in an aqueous nutrient medium under submerged aerobic conditions at about 25–35° C. for about 48 to 60 hours to produce a fermentation broth. The antibiotic is then recovered from the fermentation broth.

Figure 1:
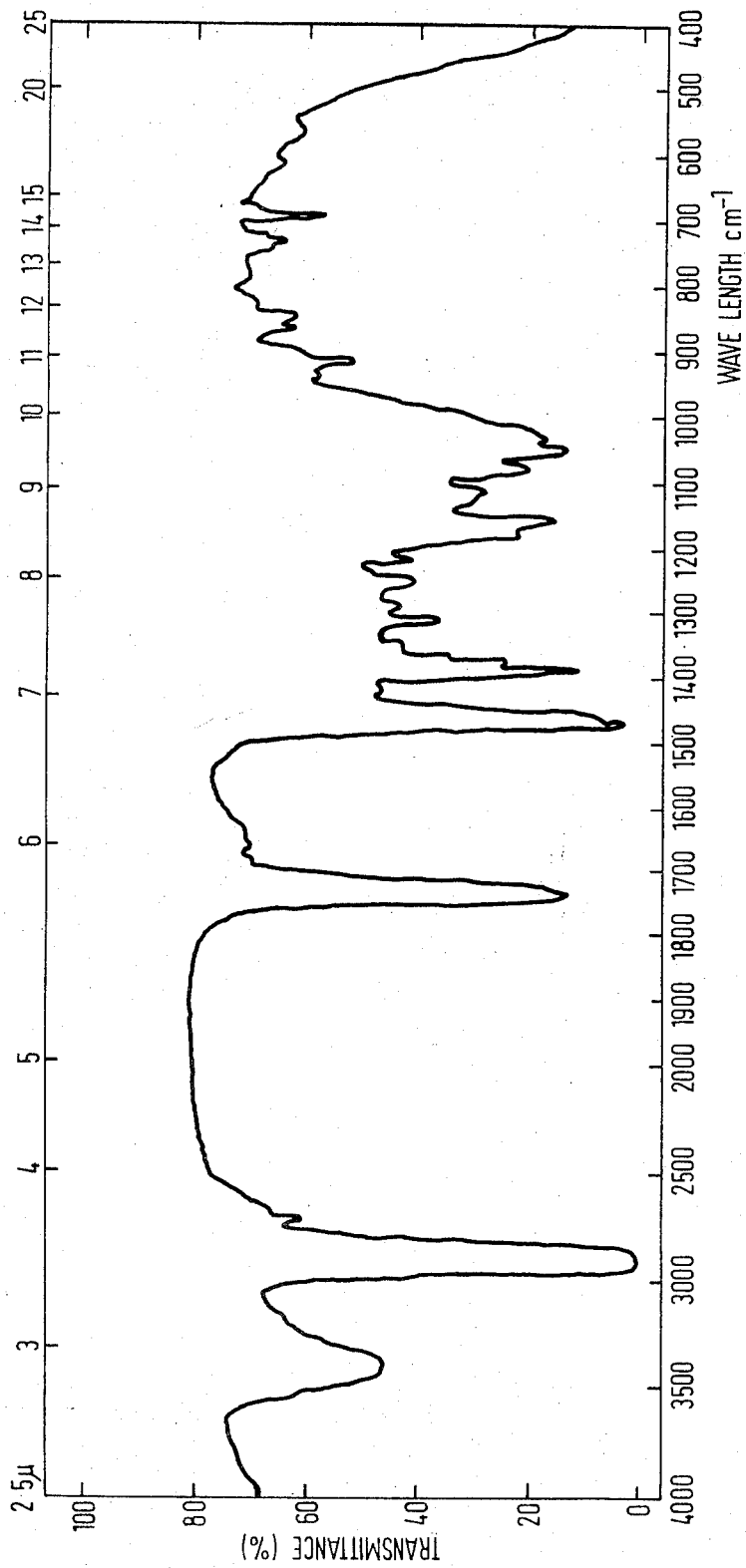

The present invention relates to a series of novel macrolide antibiotics collectively designated as YL 704 and a process for preparing same. Furthermore, this invention relates to the production of these antibiotics by fermentation, the concentration and isolation of said antibiotics, and to the preparation of their salts. Still further, it includes within its scope the antibiotics in dilute form, as crude concentrates, and in pure form. The products of the present invention are novel and particularly effective in inhibiting the growth of gram-positive bacteria.

The YL 704-producing strain of the present invention was isolated from a soil sample collected in Taipei, Republic of China (Formosa). The strain was recognized as a variant strain of Streptomyces platensis by their morphological, cultural and physiological characteristics. A viable culture of the microorganism has been deposited with the Agricultural Research Service Culture Collection of the United States Department of Agriculture, Peoria, Ill., U.S.A., under the accession number NRRL 3761.

Streptomyces sp. NRRL 3761 shows the following microbiological characteristics:

MORPHOLOGICAL CHARACTERISTICS

On a variety of agar media, the strain shows peculiar growth of actinomycetes, forming grayish aerial mycelia. On the microscopic observation, compact spirals are formed in aerial mycelia. The conidiospores are formed in chains of not less than ten elliptical to cylindrical spores of 0.6 to 1.0$\mu$ in size. The surface of the spores is smooth. Spores frequently coalesce to form black, moist (hygroscopic) masses of spores. They sometimes produce a black, moist surface.

CULTURAL CHARACTERISTICS

The numbers in parentheses correspond to the hue numbers used in "Color Harmony Manual," 3rd Edition, published by the Container Corporation of America.

(1) Czapek's agar plate (at 27° C.): colorless to light brownish gray(2dc) growth with pale yellowish brown (3gc) reverse; forming light gray(d) powery aerial mycelia; producing dull yellow orange(3ic) soluble pigment.

(2) Asparagine glucose agar plate (at 27° C.): colorless growth with pale yellowish brown(4gc) reverse; forming white to light brownish gray(3fe) powdery aerial mycelia; producing grayish red(6½lg) soluble pigment.

(3) Calcium maleate agar plate (at 27° C.): colorless growth with pale yellow(2db) reverse; forming white to grayish yellow-brown(3ge) powdery aerial mycelia. Said mycelia later become moistened and exhibit dark, smeary (hygroscopic) mass of spores; producing no soluble pigment.

(4) Czapek's glucose nitrate solution (at 27° C.): pale yellow(2db) annular growth; forming white powdery aerial mycelia; producing pale yellow(2fb) soluble pigment.

(5) Nutrient agar slant (at 37° C.): colorless to light brownish gray(2ec) growth with pale yellow(2db) reverse; forming grayish white(b) aerial mycelia; producing no soluble pigment.

(6) Glucose nutrient agar slant (at 37° C.): pale yellow(2db) to light brownish gray(2ec) growth with yellowish brown(3ne) reverse; forming white to light brownish gray(3fe) aerial mycelia; producing no soluble pigment.

(7) Loeffler's coagulated serum (at 37° C.): pale yellow(3bs) to light brownish gray(2dc) growth; forming grayish white(b) powdery aerial mycelia; producing no soluble pigment.

(8) Potato plug (at 37° C.): pale yellow(2db) to pale brown(2fb) growth; forming white powdery aerial mycelia; not changing the color of the plug.

(9) Peptone glucose agar plate (at 37° C.): colorless to light brownish gray(2ec) growth with light brown (4pg) reverse; forming white to grayish white(b) aerial mycelia; producing no soluble pigment.

(10) Egg agar medium (at 37° C.): pale yellow(2db) growth; forming white to grayish white(b) powdery aerial mycelia; producing no soluble pigment.

(11) Gelatin stab (at 20° C.): colorless growth; forming no aerial mycelium; producing no soluble pigment.

(12) Starch agar plate (at 27° C.): pale yellowish brown(2gc) to pale brown(4ge) growth with pale brown (5ge) reverse; forming light brownish gray(2fe) aerial mycelia. Said mycelia later become moistened and exhibit dark, smeary mass of spores; producing pale brown (4gc) soluble pigment of pH-indicative nature.

(13) Tyrosine agar plate (at 27° C.): pale brown (4ec) to brown(5lg) growth with light brown(5ni) reverse; forming white to brownish gray(5fe) powdery aerial mycelia; producing pale reddish brown(5ge) soluble pigment of pH-indicative nature.

(14) Litmus milk (at 37° C.): colorless to pale yellow (2ba) growth; forming no aerial mycelium; changing the color of the medium to reddish gray(6ge).

(15) Cellulose medium (at 27° C.): no growth.

(16) Bennett's agar slant (at 27° C): colorless growth with yellowish brown(3ni) reverse; forming at the initial phase grayish yellow-brown(3ge) powdery to velvety aerial mycelia. Said mycelia at the mature phase become brownish gray(5fe), forming moistened black patches which gradually spread over the whole surface; producing pale yellowish brown(3gc) soluble pigment.

UTILIZATION OF CARBON SOURCES

The carbon utilization of the strain are arabinose, xylose, glucose, mannose, maltose, fructose, sucrose, innositol, raffinose, galactose, starch, glycerol and mannitol. Lactose, rhamnose and salicin are not used.

PHYSIOLOGICAL CHARACTERISTICS

The strain is positive in starch hydrolysis, nitrate reduction, milk coagulation and milk peptonization, and negative in gelatin liquefaction, tyrosinase reaction, cellulase reaction and chromogenic action.

TEMPERATURE AND pH FOR GROWTH

The strain is aerobic, and shows good growth at 37° C. in a pH range of 6.0 to 8.0. It also grows in a pH of 5.0 and 9.0 at the same temperature. At 27° C., it grows in a pH range of 5.0 to 9.0. However, no growth can be seen in a pH of 4.0 irrespective of temperature, and at 0° C. or 50° C. irrespective of pH.

According to the taxonomy of actinomycetes, the strains of which the aerial mycelia become moistened and exhibit dark, smeary (hygroscopic) mass of spores at the mature phase are classified into Streptomyces hygroscopicus-group. From the micromorphology of their spores, the strains of this group are further divided into two groups, i.e., Streptomyces hygroscopicus-type strains and Streptomyces platensis-type strains (H. D. Trener et al., Applied Microbiology, vol. 15, No. 3, pp. 637–639 (1967); Alma Dietz et al., ibid, vol. 16, No. 6, pp. 935–941 (1968)). From the above-mentioned properties, Streptomyces sp. NRRL 3761 is defined to be a Streptomyces platensis-type strain. The following strains have been known as those belonging to this section; Str. platensis, Str. hygroscopicus var. decoicus, Str. hygroscopicus var. angustmyceticus, Str. hygroscopicus forma. glebosus, Str. hygroscopicus var. ossamyceticus, Str. hygroscopicus var. odoratas and Str. humidus. However, these strains except Streptomyces platensis are apparently different from Streptomyces sp. NRRL 3761 in their micromorphological characteristics. Streptomyces platensis is also different from streptomyces sp. NRRL 3716 in its reverse colors on the synthetic media and the colors of soluble pigment. In spite of such differences, however, Streptomyces platensis and Streptomyces sp. NRRL 3761 are similar in other properties including the morphological and physiological properties and the utilization pattern of carbon sources. Therefore, the YL 704-producing strain NRRL 3761 is thus determined as a variant strain of Streptomyces platensis.

It is to be understood that the present invention is not limited to the use of Strepomyces platensis var. sp. NRRL 3761 for the production of the antibiotic YL 704. It is intended to include the use of natural or artificial mutants or variants produced therefrom. The artificial production of mutants or variants may be accomplished by a conventional operation such as X-rays, ultraviolet radiation and nitrogen mustards. It is also intended to include the use of YL 704-producing strains which conform to the same species of the above strain.

According to the present invention, a novel macrolide antibiotic composition YL 704 can be prepared by fermenting a YL 704-producing strain such as Streptomyces platensis var. sp. NRRL 3761 or its mutants under aerobic condition in an aqueous nutrient medium and recovering the antibiotic composition from the fermentation broth.

The fermentation may be carried out by either shaking cultivation or submerged fermentation under aeration and agitation. The composition of the nutrient medium may be varied over a wide range. Essentially what is required is a carbon source, a nitrogen source and trace inorganic elements. Examples of suitable carbon sources are glucose, lactosee, maltose, starch, glycerol, innositol and soybean oil. Suitable sources of nitrogen for the fermentation process include peptone, meat extract, yeast extract, corn steep liquor, cotton seed meal, soybean meal, peanut meal, protein hydrolyzate, inorganic nitrates and ammonium sulfate. Examples of suitable sources of inorganic elements are sodium chloride, calcium chloride, magnesium sulfate, calcium carbonate, phosphate and salts of heavy metals such as iron, zinc, copper and manganese. If excessive foaming is encountered during the fermentation, anti-foaming agents such as silicon oil, vegetable oils or surfactants may be added to the fermentation medium. The fermentation is carried out in a neutral medium at about 25 to 35° C., preferably at about 27° C. The concentration of the antibiotic activity in the fermentation medium can be readily examined during the course of the fermentation by testing samples of said medium in accordance with the cup-plate method using Bacillus subtilis. The pH-value of the fermentation medium shows a tendency to decrease at an early stage of the fermentation, but it gradually increases after about 24 to 30 hours. The maximum yield of the antibiotic composition YL 704 can be obtained after about 48 to 60 hours of the fermentation, when the pH-value of the fermentation medium reaches to about 7.4 to 8.0.

The antibiotic composition YL 704 is mainly accumulated in the fermentation broth and after growth of the microorganisms, mycelia and other solid compositions are removed from the fermentation broth by applying standard equipment such as filter presses and centrifuges, using diatomaceous earth as a filter aid, if necessary. The antibiotic composition YL 704 can be recovered from the filtrate by conventional procedures. For example, the colorless, slightly basic powders of said composition are preferably obtained by extracting the filtrate with water-immiscible organic solvent (e.g., halogenated hydrocarbon, esters of fatty acids, ketones or alkanols having 4 to 8 carbon atoms) at neutral pH and evaporating the solvent from the extract. Alternatively, the antibiotic composition YL 704 is obtained by treating the filtrate with an appropriate adsorbent (e.g., activated charcoal, bentonite, aluminium oxide or silica gel), extracting said adsorbent with an aqueous acidic acetone or lower alkanols, and separating the liberated antibiotic composition from the aqueous extract. A combination of the above-mentioned procedures is also preferred for the recovery and purification of said antibiotic composition.

The thus obtained antibiotic composition YL 704 is highly soluble in methanol, ethanol, butanol, methyl acetate, ethyl acetate, butyl acetate, chloroform, acetone, ethyl ether and benzene. It is slightly soluble in water, but not soluble in cyclohexane, n-hexane and petroleum-ether. It is negative to Tollens, Fehling, Molish, Ninhydrin, biuret and ferric chloride reactions. It gives positive ferric hydroxamate reaction. It fades the color of an aqueous bromine solution and of an aqueous potassium permanganese solution. It shows reddish violet in concentrated sulfuric acid, and tartar in concentrated hydrochloric acid at room temperature. These colors do not change with chloroform in n-butanol.

The antibiotic YL 704 thus obtained comprises at least two groups of antibiotic substances, one of which is designated as YL 704 A, this material being further divided into at least two components YL 704 $A_1$ and YL 704 $A_2$. The other is designated as YL 704 B, which can also be further divided into at least two components YL 704 $B_1$ and YL 704 $B_2$.

The antibiotic composition YL 704 has indefinite physical constants such as melting point, analytical values of elements and specific rotation because the content ratio of YL 704 A and B in the antibiotic composition YL 704 varies with the condition of fermentation and/or extraction. In one example, however, the antibiotic composition obtained in Example 4 described hereinafter begins to decompose at 139° C. and melts at 145° to 146° C. It has the following analytical values:

C, 60.56±1.0%, H, 8.22±0.5%, N, 1.56 ±0.3%

The infrared absorption spectrum is shown in FIG. 1 of the accompanying drawings.

The separation of the antibiotic composition YL 704 into groups YL 704 A and YL 704 B, or the further separation of YL 704 A and YL 704 B respectively into YL 704 $A_1$, $A_2$, $B_1$ and $B_2$, and their purification can be accomplished by conventional means. For example, counter current distribution, column chromatography (e.g., alumina, silica-gel or silicic acid column chromatography) or a combination of these procedures are preferred for these purposes.

The physico-chemical properties of the thus obtained antibiotics of the present invention are shown as follows:

(1) Appearance.—YL 704 $A_1$, $A_2$, $B_1$ and $B_2$ shows respectively white needles of basic nature.

(2) Melting point:

YL 704 $A_1$: 122 to 123° C.
YL 704 $A_2$: 193 to 194° C.
YL 704 $B_1$: 131 to 132° C.
YL 704 $B_2$: 129 to 132° C.

(3) Specific rotation ($[\alpha]_D^{21}$, c.=1, chloroform):

YL 704 $A_1$: —50.2°
YL 704 $A_2$: —49.0°
YL 704 $B_1$: —42.1°
YL 704 $B_2$: —42.0

(4) Analysis:

YL 704 $A_1$: C, 61.26; H, 8.38; N, 1.88; O, 28.55
YL 704 $A_2$: C, 60.93; H, 8.36; N, 1.93; O, 28.12
YL 704 $B_1$: C, 60.89; H, 8.33; N, 1.71; O, 29.16
YL 704 $B_2$: C, 59.99; H, 8.15; N, 1.68; O, 29.51.

(5) Molecular weight (vapor pressure osmometric method in chloroform):

YL 704 $A_1$: 834, 865
YL 704 $A_2$: 822, 854
YL 704 $B_1$: 805, 835
YL 704 $B_2$: 796, 840

(6) Molecular formula.—From the results of analysis and molecular weight, the molecular formula of the antibiotics is to be as follows:

YL 704 $A_1$: $C_{43}H_{71}NO_{15}$
YL 704 $A_2$: $C_{43}H_{71}NO_{15}$
YL 704 $B_1$: $C_{41}H_{67}NO_{15}$
YL 704 $B_2$: $C_{40-42}H_{65-69}NO_{15}$ (7) Infrared absorption spectra (in Nujol) of the antibiotics is shown in FIGS. 2 to 5 of the accompanying drawings.

(8) Ultraviolet absorption spectra (in ethanol) of the antibiotics is shown in FIGS. 6 to 9 of the accompanying drawings.

(9) Solubility.—The solubility of YL 704 $A_1$, $A_2$, $B_1$ and $B_2$ in organic solvents are the same as YL 704.

(10) Color reaction.—YL 704 $A_1$, $A_2$, $B_1$ and $B_2$ shows the same color reactions of YL 704.

(11) $pK_a$-value (50% ethanol):

YL 704 $A_1$: 6.90
YL 704 $A_2$: 6.85
YL 704 $B_1$: 7.00
YL 704 $B_2$: 6.90

(12) Rf-value of the antibiotics by thin layer chromatography are shown in the following table:

TABLE I

| Thin layer plate | Solvent | Antibiotics $A_1$ | $A_2$ | $B_1$ | $B_2$ |
|---|---|---|---|---|---|
| Silica gel (Kiesel Gel GF 254). | A mixture of 8 ml. of ethylacetate, 2 ml. of n-hexane and a drop of concentrated aqueous ammonia. | 06.8 | 0.68 | 0.53 | 0.53 |
| Do | A mixture of 3 ml. of benzene and 2 ml. of acetone. | 0.60 | 0.53 | 0.47 | 0.41 |
| Aluminium oxide-silica gel (Kiesel Gel GF 254) (4:1). | do | 0.59 | 0.42 | 0.50 | 0.33 |

(13) Salt formation.—The antibiotics of the invention are convertible to the acid addition salts by conventional means. For example, the inorganic acid addition salts such as hydrochloride, hydrobromide, sulfate and phosphate, and the organic acid addition salts such as acetate, pyruvate, tartarate, citrate, malate and aspartate are readily obtained by using the corresponding organic or inorganic acid.

The bacteriological activities of the antibiotics of the present invention are shown as follows:

(1) Antibacterial spectrum.—The antibiotics show the activity against a variety of microorganisms. The invitro antimicrobial activity of the antibiotics determined by the successively two-fold dilution method are shown in the following table. Except where otherwise noted, the results are based on the activity after 24 hours of the incubation.

TABLE II

| Organism | Medium | Minimum inhibitory concentration (mceg./ml.) | | |
|---|---|---|---|---|
| | | YL 704 | YL 704 A | YL 704 B |
| Staphylococcus aureus FDA-209P | I | 1.56 | 1.56 | 1.56 |
| Staphylococcus aureus Terashima | I | 1.56 | 1.56 | 1.56 |
| Staphylococcus aureus Smith | I | 3.12 | 3.12 | 3.12 |
| S. aureus (penicillin, streptomycin, tetracycline-resistant) | I | 3.12 | 3.12 | 6.25 |
| S. aureus (streptomycin-resistant) | I | 6.25 | 6.25 | 6.25 |
| S. aureus (erythromycin-resistant) | I | >100 | >100 | >100 |
| S. aureus (leucomycin-resistant) | I | >100 | >100 | >100 |
| Streptococcus hemolyticus | II | 0.78 | 0.78 | 1.56 |
| Diplococcus pneumoniae | III | 0.78 | 0.78 | 0.78 |
| Corynebacterium diphtaeriae Park William | II | 0.39 | 0.39 | 0.39 |
| Hemophilus pertussis Tohama | III | ¹ 0.78 | ¹ 0.78 | ¹ 0.78 |
| Neisseria meningitidis Group A 13077 | III | 3.12 | 3.12 | 3.12 |
| Batillus subtilis PCI 219 | I | 0.78 | 0.78 | 1.56 |
| Escherichia coli K-12 | I | >100 | >100 | >100 |
| Shigella dysenteriae | I | 50 | 50 | 50 |
| Shigella flexneri 2a | I | 25 | 25 | 50 |
| Salmonella typhi T-58 | I | 100 | 100 | 100 |
| Proteus vulgaris | I | 50 | 50 | 100 |
| Klebsiella pneumoniae | I | 12.5 | 12.5 | 12.5 |
| Pseudonas aeruginosa | I | >100 | >100 | >100 |
| Mycobacterium tuberculosis $H_{37}$ Rv | IV | ² >100 | ² >100 | >100 |
| Mycobacterium Sp. ATCC 607 | V | ¹ 6.25 | ¹ 6.25 | ¹ 6.25 |
| Mycobacterium phlei | V | ¹ 6.25 | ¹ 6.25 | ¹ 6.25 |
| Zanthomonas oryzae | VI | ¹ 0.78 | ¹ 0.78 | ¹ 0.78 |
| Mycoplasma pneumoniae Mac | VII | ¹ 0.06 | ¹ 0.06 | ¹ 0.06 |
| Mycoplasma gallisepticum Kp-13 | VIII | ¹ 1.0 | ¹ 1.0 | ¹ 1.0 |
| Candida albicans | IX | >100 | >100 | >100 |
| Aspergillus niger | IX | >100 | >100 | >100 |
| Penicillium notatum | IX | >100 | >100 | >100 |

¹ The activity after 48 hours incubation.
² The activity after 2 weeks incubation.

NOTE.—Medium: I = Difco's nutrient broth; II = Difco's brain heart infusion broth; III = Difco's brain heart infusion broth with 10% horse serum; IV = Kirchner's medium; V = glycerol nutrient broth; VI = Noken's liquid medium; VII = Difco's PPLO broth; VIII = Eiken's PPLO liquid medium; IX = Sabouraud's liquid medium.

From the preceding table, it is noted that the antibiotics are characteristically active against gram-positive bacteria, mycoplasmas, a limited number of gram-negative bacteria such as *Hemophilus pertussis* and *Neisseria meningitidis* and a limited number of acid-fast bacteria. It is also noted that they are slightly active against most of gram-negative bacteria, *Mycobacterium tuberculosis* and macrolide antibiotic-resistant bacteria. It is further noted that their activities are not inhibited in the presence of serum.

(2) Toxicity.—The acute toxicity of the antibiotics are remarkably low. For example, even when the said antibiotics were intraperitoneally administered to mice of body weight 20 g. at a dose of 400 mg./kg., no mice died.

(3) Protective test against infection.—Mice inoculated intraperitoneally with *Staphylococcus aureus* Smith (treated with mucin) prior to the administration of the antibiotic are protected from death by infection when administered a dose of 1 mg./kg. of the antibiotics intraperitoneally.

From the physico-chemical and biological characteristics of the antibiotics of the invention, said antibiotics can be members of the basic macrolide antibiotics.

Among the basic macrolide antibiotics, spiramycin, tertiomycin A and B, furomacidin D, miamycin, 446-substance, josamycin and leucomycin A and B, are similar to the antibiotics of the present invention with respect to the maximum ultraviolet absorption at 230 to 234 m$\mu$. However, the basic macrolide antibiotics except for josamycin and leucomycin are apparently different from the antibiotics of the present invention in their nitrogen content, Molish reaction and the colors in concentrated sulfuric acid and/or in concentrated hydrochloric acid, etc. The physico-chemical property of josamycin and leucomycin are similar to the antibiotics of the present invention. However, josamycin is different in that it shows a strong infrared-absorption at 1234 cm.$^{-}$, while the antibiotics of the present invention do not show such an absorption.

Figure 10:
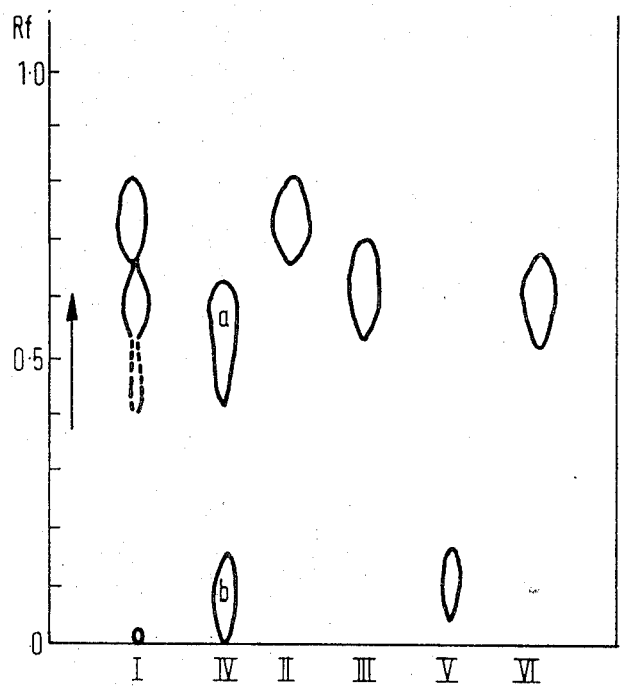
Figure 11:
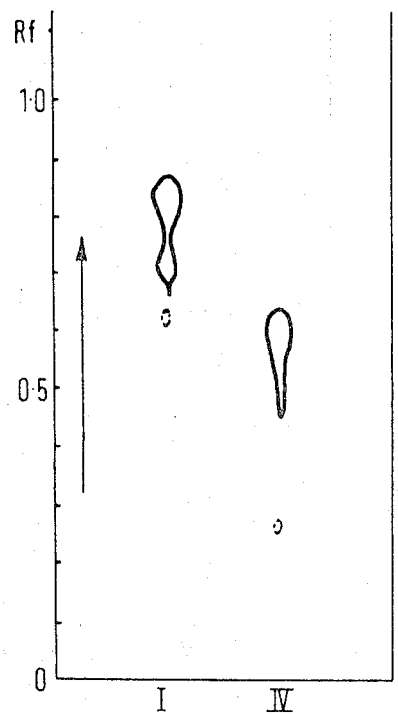

Leucomycin A is a mixture of several antibiotic principles, which are grouped into Leucomycin $A_1$-series antibiotics and Leucomycin $A_3$-series antibiotics. The former series antibiotics are characterized by the absence of intense infrared absorption band at 1220 to 1260 cm.$^{-}$, while the latter, similar to josamycin, possesses the intense absorption band at 1220 to 1260 cm.$^{-}$ due to the acetoxy function in the molecule. Thus, leucomycin $A_3$-series antibiotics are readily different from the antibiotics of the present invention. Leucomycin $A_1$-series antibiotics and the antibiotics of the present invention differ in their chromatography such as thin layer chromatography and paper chromatography. Namely, when developed with ethylacetate on a thin layer plate of aluminium oxide (manufactured by Wellm Co.) or with a 1/5 mol phosphate buffer solution saturated with n-butyl acetate (pH 5.9) on a filter paper (Toyo's filter paper No. 50 washed with the same buffer solution prior to the development), the Rf-value of Leucomycin $A_1$-series antibiotics differ from the antibiotics of the present invention (shown in FIGS. 10 and 11 of the accompanying drawings). Leucomycin B is also different from the antibiotics of the present invention with regard to benzene solubility. Furthermore, there has been found no antibiotic corresponding to the antibiotics of the invention in Umezawa's "Index of Antibiotics from Actinomycetes" (1967) and other papers. Thus, the antibiotics of the present invention are novel macrolide antibiotics.

A practical and presently-preferred embodiment of the invention is illustratively shown in the following examples. In the following descriptions the activity is measured biologically by the cup-plate method using *Batillus subtilis* as a sensitive microorganism. This activity is estimated with a sample of pure YL 704 A as 1000 mcg./mg.

Example 1 (Cultivation)

In a 200 liter volume fermentation tank, there is charged 120 liter of the nutrient medium containing the following materials:

| Material: | Percent (weight/volume) |
| --- | --- |
| Innositol | 2 |
| Soybean meal | 2 |
| Glyerol | 1 |
| Starch | 1 |
| Yeast extract | 1 |
| Sodium chloride | 0.1 |
| Calcium carbonate | 0.35 |
| Mineral salts solution [1] | 0.1 |

[1] An aqueous solution containing 0.05% of copper sulfate 5 hydrate, 0.05% of magnesium chloride 7 hydrate and 0.05% of zinc chloride.

The medium is adjusted to pH 7.0 and sterilized at 120° C. for 20 minutes. After cooling, the medium is inoculated with a seed culture of *Streptomyces platensis* NRRL var. sp. 3761 obtained by cultivating in a nutrient medium having the abovementioned composition for 76 hours (except that the contents of Yeast extract and sodium chloride are 0.5% and 0.25%, respectively). The cultivation is carried out at 27° C. under aeration with 60 to 70 liter/minute while agitating at 260 rotation/minute, during which the inner pressure is maintained at 0.5 kg./cm.$^2$. The pH-value of the medium decreases to 6.3 at 20 hours of cultivation. After 30 hours of cultivation, the pH of the medium increases gradually. The pH reaches a value of 7.8 after about 45 hours. The antibiotic composition YL 704 begins to accumulate at about 24 hours of the cultivation. The maximum yield (200 to 40 mcg./ml.) of antibiotic composition is obtained after about 45 hours of the cultivation.

Example 2 (Extraction and concentration by the activated charcoal)

The fermentation broth obtained in Example 1 is filtered with the aid of 5% of diatomaceous earth thereby obtaining 100 liter of the filtrate (250 mcg./ml.) The filtrate is adjusted to a pH of 8.0 with aqueous ammonia. 0.5 kg. of activated charcoal and 0.5 kg. of diatomaceous earth are added to the filtrate and the mixture is stirred for 30 minutes. By this operation, the antibiotic composition YL 704 is completely adsorbed into the charcoal. The activated charcoal is collected by filtration, washed with water and extracted twice with 25 liter of 80% aqueous acetone or methanol (pH 2.0 adjusted with hydrochloric acid). After adjusting the pH to 7.0, the extract is concentrated to 10 liter under reduced pressure. The thus obtained solution shows an activity of 2400 mcg./ml. The yield is greater than 95% of theoretical.

Example 3 (Extraction and concentration by the solvent)

120 liter of the fermentation broth obtained in Example 1 is filtered with the aid of 5% of diatomaceous earth. The filtrate is adjusted to a pH of 7.0 to 8.0 and 7 kg. of sodium chloride is dissolved into the filtrate. The solution is extracted twice with 40 liter of ethyl-acetate. The extract is concentrated to 10 liter under reduced pressure whereby the concentrated solution showing the activity of 1218 mcg./ml. is obtained. The solution is extracted twice with 1 liter of acidic water (pH 2.0). The aqueous layer is then adjusted to pH 8.0 and re-extracted twice with 1 liter of benzene. The combined benzene layers are concentrated to dryness under reduced pressure. 15.6 g. of the crude crystals thus obtained is dissolved in 100 ml. of benzene. The solution is poured onto a column of 15.6 g. of aluminum oxide (manufactured by Wellm Co.) wetted with benzene. The column is then eluted with ethyl-acetate, and the fractions showing bacterial activity are collected. The collected eluates are concentrated to dryness whereby 14 g. of the antibiotic composition YL 704 is obtained as powder.

Example 4 (Crystallization of the antibiotic composition YL 704)

4.0 g. of the antibiotic composition YL 704 obtained in Example 3 is dissolved in 50 ml. of benzene. To this solution n-hexane is added dropwise until the appearance of white muddiness in the solution. After standing in a refrigerator, the precipitating crystals are collected by filtration whereby 2.9 g. of the antibiotic composition YL 704 is obtained as prisms.

Example 5 (Separation of YL 704 A and YL 704 B by chromatography)

3 g. of the antibiotic composition YL 704 obtained in Example 4 is dissolved in 20 ml. of chloroform. The solution is poured onto a column of 300 g. of silica gel (manufactured by Merck & Co. under the trade name "Kiesel Gel H") charged in a tube of 5 cm. diameter x 60 cm. high. The column is developed with a mixture containing 100 volumes of chloroform, 0.5 volume of 80% aqueous acetic acid and 3 to 6 volumes of methanol and every 100 ml. fraction is collected. The methanol content is adjusted to 3 volumes in fractions No. 1–250, 4 volumes in fractions No. 251–350, 5 volumes in fractions No. 351–600, and 6 volumes in fractions more than 600. By this operation, YL 704 A is eluted into fracitons No. 271 to No. 661 and YL 704 B into fractions No. 631 to No. 771. The eluates of fractions No. 311 to No. 489 are combined and the solvent evaporated whereby 550 mg. of YL 704 A is recovered as powder. 580 mg. of YL 704 B is also recovered from the eluates of fractions No. 662 to 761 by the same means as described above.

YL 704 A and YL 704 B thus obtained are respectively recrystallized from a mixture of benzene and n-hexane to give white to slightly pale yellow crystals.

Example 6 (Separation of YL 704 A and YL 704 B by the countercurrent distribution)

200 mg. of YL 704 obtained in Example 3 is purified by the countercurrent distribution procedure, using Mac-Ilvein's buffer solution (pH 4.0). The operation is carried out in the Craig's countercurrent distribution instrument. After 100 times transfer YL 704 A is distributed in tubes No. 51 to No. 71 and YL 704 B in tubes No. 24 to No. 30. Thus, YL 704 A and YL 704 B are respectively recovered by evaporation as a powder.

Example 7 (Separation of YL 704 A and YL 704 B by column chromatography)

108 g. of the antibiotic composition YL 704 obtained in Example 4 is subjected to column chromatography on a column of 2,400 g. of silicic acid (manufactured by Mallinckrodt Chemical Works) charged in a tube of 8 cm. diameter x 120 cm. high, using as the solvent a mixture of benzene and acetone (acetone content: 15 to 50 v./v. percent, and every 500 ml. fraction is collected. The acetone content of the solvent is adjusted to 15% in fractions No. 1–4, 30% in fractions No. 5–20, 40% in fractions No. 21–24 and 50% in fractions No. 25–30. By this operation, YL 704 A is eluted mainly into fractions No. 7–13 and YL 704 B mainly into fractions No. 15–27. The eluate of fractions No. 7–11 are combined and evaporated to remove solvent whereby 7.12 g. of YL 704 A is recovered as powder. 17.1 g. of YL 704 B is also recovered as powder from the eluate of fractions No. 15–26 by the same means as described above.

Example 8 (Separation and purification of YL 704 $A_1$ and YL 704 $A_2$)

3 g. of YL 704 A obtained in Example 7 is subjected to column chromatography on a column of 300 g. of aluminium oxide (manufactured by Wellm Co.) charged in a tube of 5 cm. diameter x 50 cm. high, using as the solvent a mixture of benzene and ethylacetate (100 volumes: 10–40 volumes v./v.), and every 20 ml. fraction is collected. The ethylacetate content of the solvent is adjusted to 10 volumes in fractions No. 1–50, 20 volumes in fractions No. 51–200, 30 volumes in fractions No. 201–450 and 40 volumes in fractions No. 250–410. By this operation, YL 704 $A_1$ is eluted mainly into fractions No. 250–410 and YL 704 $A_2$ mainly into fractions No. 480–600. The eluate of fractions No. 280–350 are combined and evaporated to remove solvent whereby 2.1 g. of YL 704 $A_1$ is obtained as powder. 380 mg. of YL 704 $A_2$ is also recovered from the eluate of fractions No. 515–592 by the same means as above.

The YL 704 $A_1$ and YL 704 $A_2$ thus obtained are respectively recrystallized from benzene to give white needles.

Example 9 (Separation and purification of YL 704 $B_1$ and YL 704 $B_2$)

4 g. of YL 704 B obtained in Example 7 is subjected to column chromatography on a column of 400 g. of silicic acid (manufactured by Mallinckrodt Chemical Works) charged in a tube of 5 cm. diameter x 4 cm. high, using as the solvent a mixture of benzene and acetone (acetone content: 25 to 45 v./v. percent), and every 20 ml. fraction is collected. The acetone content of the solvent is adjusted to 25% in fractions No. 1–120, 30% in fractions No. 121–280 and 45% in fractions No. 281–395. By this operation, YL 704 $B_1$ is eluted mainly into fractions No. 115–280 and YL 704 $B_2$ mainly into fractions No. 311–385. The eluate of fractions No. 120–260 are combined and evaporated to remove solvent whereby 1.2 g. of YL 704 $B_1$ is obtained as powder. 430 g. of YL 704 $B_2$ is also recovered from the eluate of fractions No. 320–375 by the same means as above.

The YL 704 $B_1$ and YL 704 $B_2$ thus obtained are respectively recrystallized from a mixture of benzene and n-hexane to give white needles.

What is claimed is:

1. A process for producing an antibiotic which comprises cultivating a YL 704-producing strain of *Streptomyces platensis* var. sp. in an aqueous nutrient medium under aerobic conditions to produce a fermentation broth, and recovering said antibiotic from the broth.

2. The process according to claim 1, wherein the cultivation is carried out under submerged aerobic conditions.

3. The process according to claim 1, wherein the cultivation is carried out at a temperature of from about 25 to about 35° C.

4. The process according to claim 1, wherein the cultivation is carried out for a period from about 48 to about 60 hours.

5. The process according to claim 1, wherein the cultivation is carried out under submerged aerobic conditions at a temperature of from about 25 to about 35° C. for a period of from about 48 to about 60 hours.

6. The process according to claim 1, wherein the recovery of the antibiotic from the fermentation broth is carried out by filtering the fermentation broth to obtain a filtrate, extracting the filtrate with a water-immisible solven at about a neutral pH to produce an extract, and separating the antibiotic from the extract.

7. The process according to claim 1, wherein the recovery of the antibiotic from the fermentation broth is carried out by filtering the fermentation broth to obtain a filtrate, treating the filtrate with an adsorbent at neutral pH, extracting said adsorbent with an aqueous acidic acetone or alkanol to produce an extract, and separting the antibiotic from the extract.

8. The process according to claim 6, followed by subjecting the antibiotic to counter current distribution or column chromatography to separate said antibiotic into antibiotic YL 704 A and antibiotic YL 704 B.

9. The process according to claim 8, followed by subjecting antibiotic YL 704 A to column chromatography to separate the antibiotic YL 704 A into antibiotic YL 704 $A_1$ and antibiotic YL 704 $A_2$.

10. The process according to claim 8, followed by subjecting the antibiotic YL 704 B to column chromatography to separate said antibiotic YL 704 B into antibiotic YL 704 $B_1$ and antibiotic YL 704 $B_2$.

11. The process according to claim 1, wherein the YL 704-producing strain is *Streptomyces platensis* var. sp. NRRL 3761.

Figure 2:
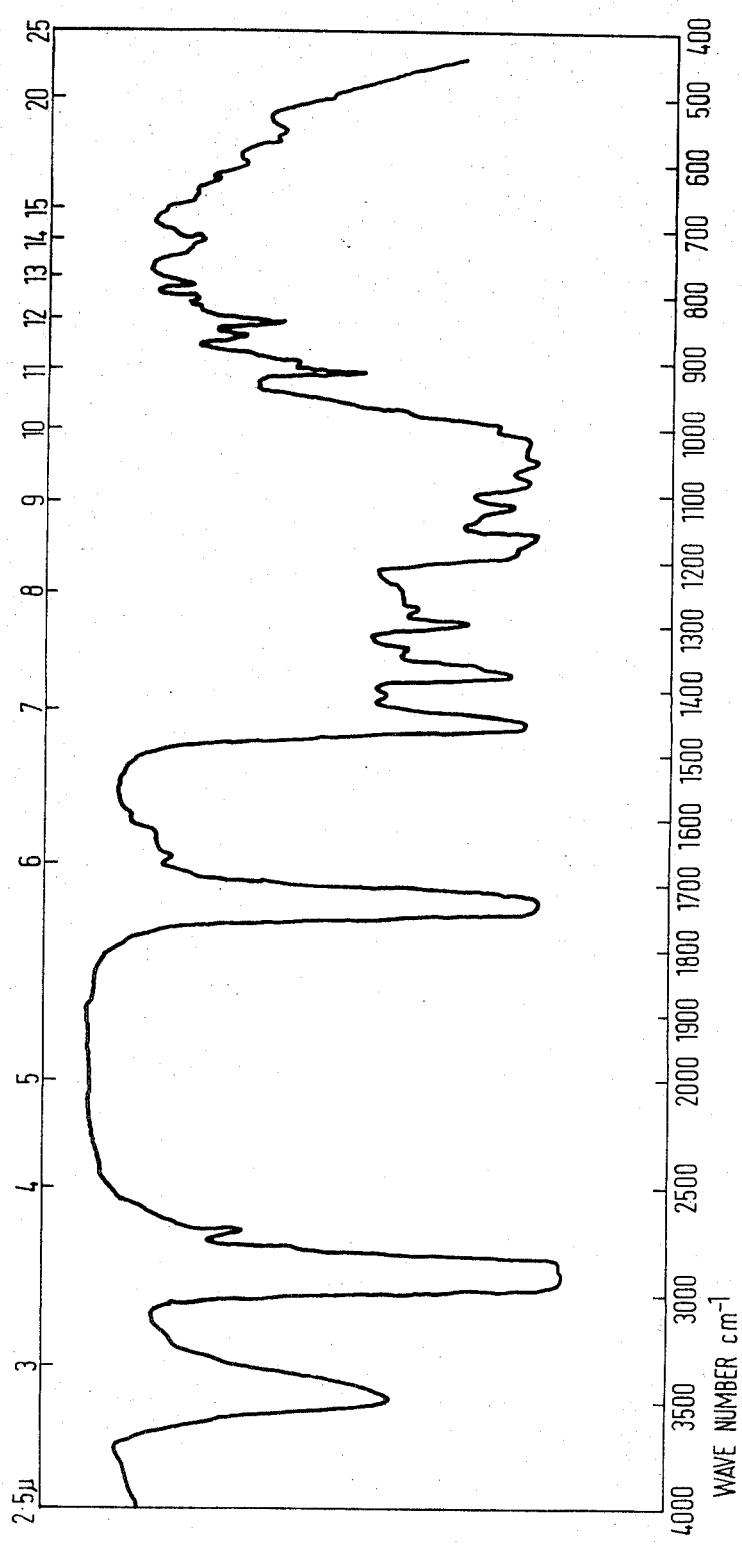
Figure 6:
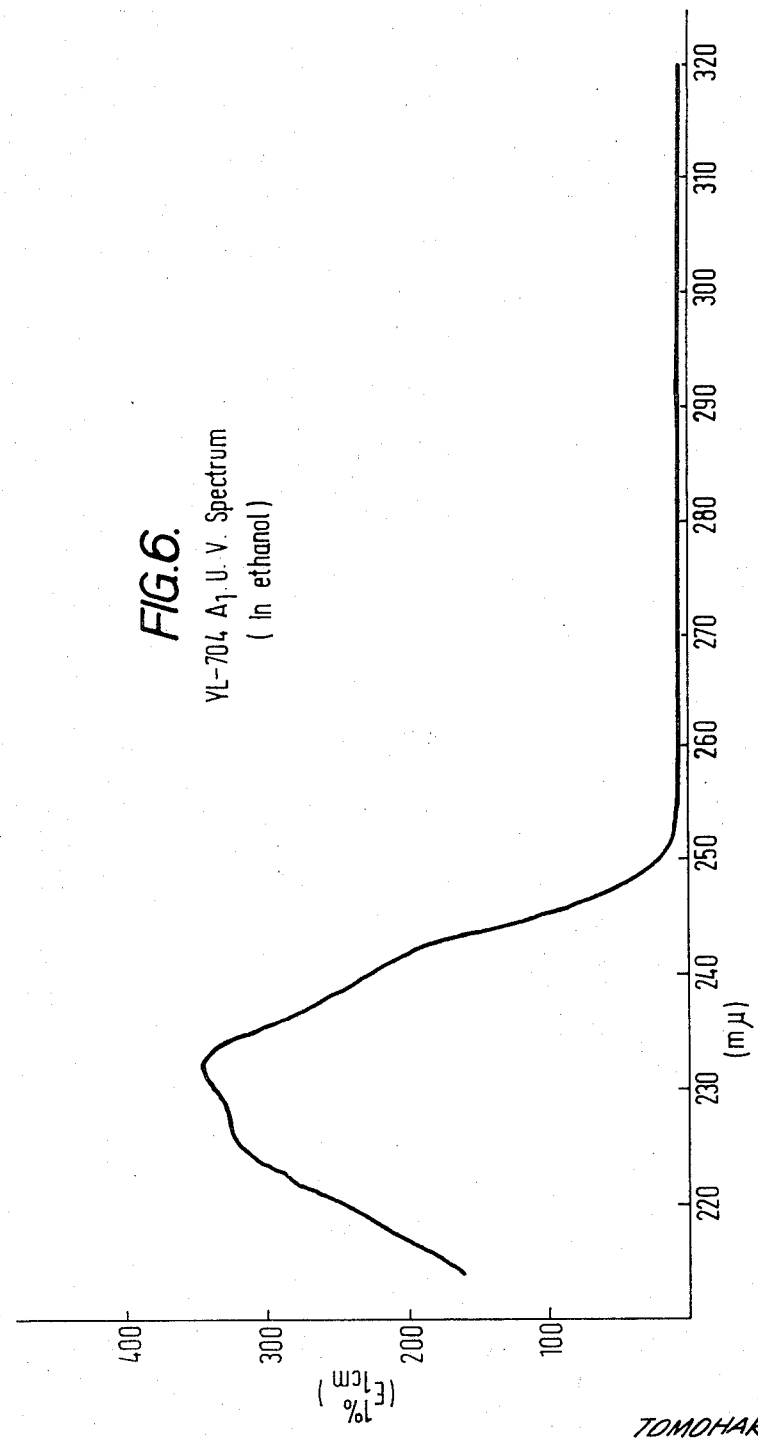

12. The antibiotic, YL 704 $A_1$, particularly effective in inhibiting the growth of gram-positive bacteria, said antibiotic being white needles having the following properties: an alkylene pH, a melting point of 122 to 123° C. and a specific rotation of $[\alpha]_D^{21}$ −50.2° (c.=1, chloroform), said antibiotic containing the elements of carbon, hydrogen, nitrogen and oxygen in substantially the following proportions by weight:

| | Percent |
|---|---|
| Carbon | 61.3 |
| Hydrogen | 8.4 |
| Nitrogen | 1.9 |
| Oxygen | 28.5 | and has a molecular weight of about 834 or 865 (in vapor pressure osometric method in chloroform), the antibiotic has an infrared absorption spectrum as shown in FIG. 2 and an ultraviolet absorption spectrum as shown in FIG. 6, the antibiotic gives a positive ferric hydroxamate reaction, and negative Tollens, Fehling, Molish, Ninhydrin biuret and ferric chloride reactions, the antibiotic fades the color of an aqueous bromine solution and of an aqueous potassium permanganese solution, turning into a reddish violet color in concentrated sulfuric acid, and turning into a tartar color in concentrated hydrochloric acid; the antibiotic is highly soluble in methanol, ethanol, butanol, methyl-acetate, butyl-acetate, chloroform, acetone, ethylether and benzene, is slightly soluble in water and is insoluble in cyclohexane, n-hexane and petroleum ether, the antibiotic has a $pK_a$-value of 6.90 (in 50% ethanol), an Rf-value of 0.68 [on a thin layer plate of silica gel (Kiesel Gel GF 254); Solvent: a mixture of 8 ml. of ethylacetate, 2 ml. of n-hexane and a drop of concentrated aqueous ammonia], an Rf-value of 0.60 [on a thin layer plate of silica gel (Kiesel Gel GF 254); Solvent: a mixture of 3 ml. of benzene and 2 ml. of acetone] and an Rf-value of 0.59 [on a thin layer plate of aluminum oxide-silica gel (Kiesel Gel GF 254) (4:1); Solvent: a mixture of 3 ml. of benzene and 2 ml. of acetone].

13. An acid addition salt of the basic substance of claim 12.

Figure 3:
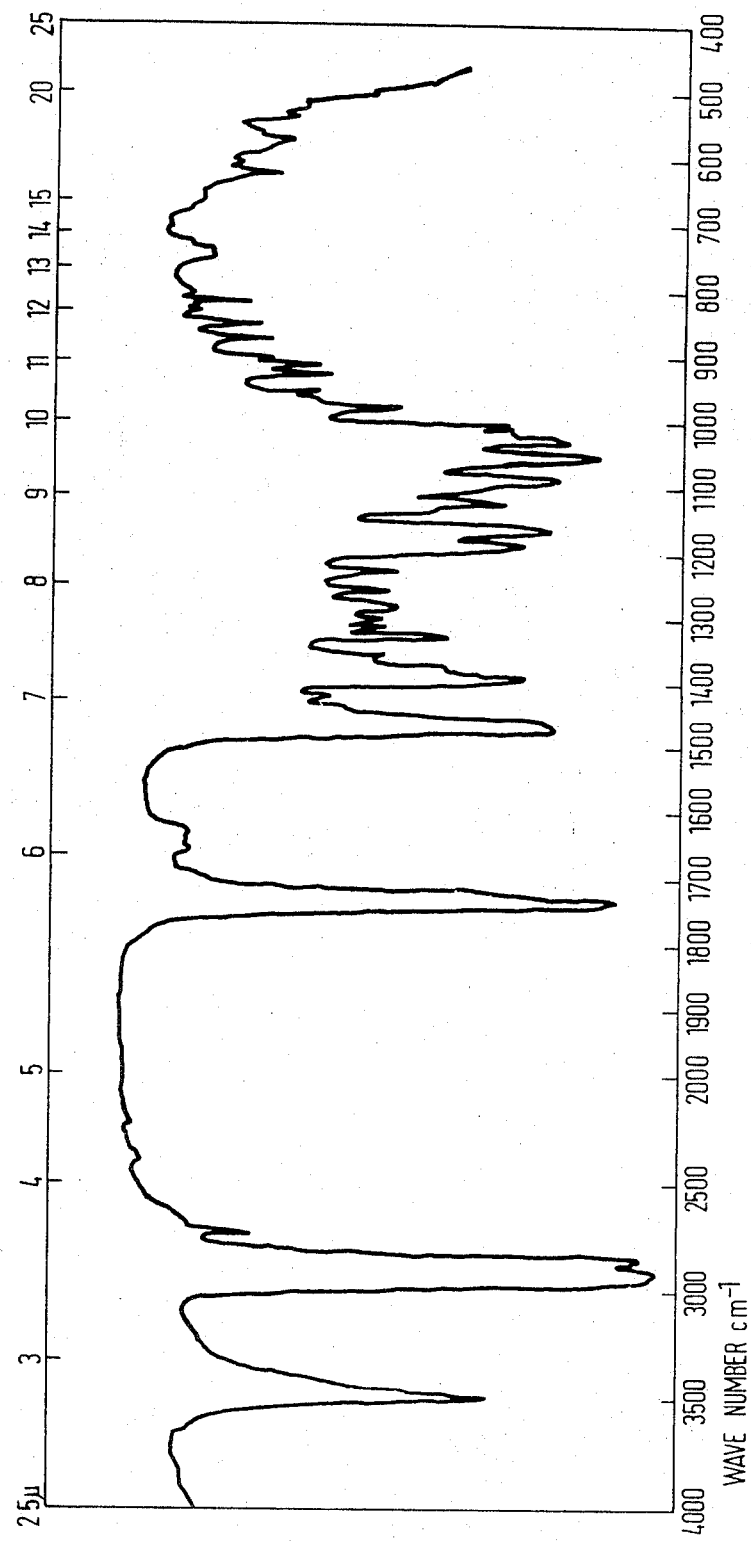

14. The antibiotic, YL 704 $A_2$, particularly effective in inhibiting the growth of gram-positive bacteria, said antibiotic being white needles having the following properties: an alkalene pH, a melting point of 193 to 194° C. and a specific rotation of $[\alpha]_D^{21}$ —49.0° (c.=1, chloroform), said antibiotic contains the elements of carbon, hydrogen, nitrogen and oxygen in substantially the following proportions by weight:

| | Percent |
|---|---|
| Carbon | 61.3 |
| Hydrogen | 8.4 |
| Nitrogen | 1.9 |
| Oxygen | 28.5 | and has a molecular weight of about 822 or 854 (in vapor pressure osmometric method in chloroform); the antibiotic has an infrared absorption spectrum as shown in FIG. 3 and an ultraviolet absorption spectrum as shown in FIGS. 7 and 9, the antibiotic gives a positive ferric hydroxamate reaction, and negative Tollens, Fehling, Molish, Ninhydrin, biuret and ferric chloride reactions; the antibiotic fades the color of an aqueous bromine solution and of an aqueous potassium permanganese solution, turning into a reddish violet color in concentrated sulfuric acid and turning into a tartar color in concentrated hydrochloric acid, the antibiotic is highly soluble in methanol, ethanol, butanol, methylacetate, butylacetate, chloroform, acetone, ethylether and benzene, slightly soluble in water and insoluble in cyclohexane, n-hexane and petroleum ether; the antibiotic has a $pK_a$-value of 6.85 (in 50% ethanol) and an Rf-value of 0.68 [on a thin layer plate of silica gel (Kiesel Gel FG 254); Solvent: a mixture of 8 ml. of ethylacetate, 2 ml. of n-hexane and a drop of concentrated aqueous ammonia], and Rf-value of 0.53 [on a thin layer plate of silica gel (Kiesel Gel FG 254); Solvent: a mixture of 3 ml. of benzene and 2 ml. of acetone], and an Rf-value of 0.42 [on a thin layer plate of aluminum oxide-silica gel (Kiesel Gel FG 254) (4:1); Solvent: a mixture of 3 ml. of benzene and 2 ml. of acetone].

15. An acid addition salt of the basic substance of claim 14.

Figure 4:
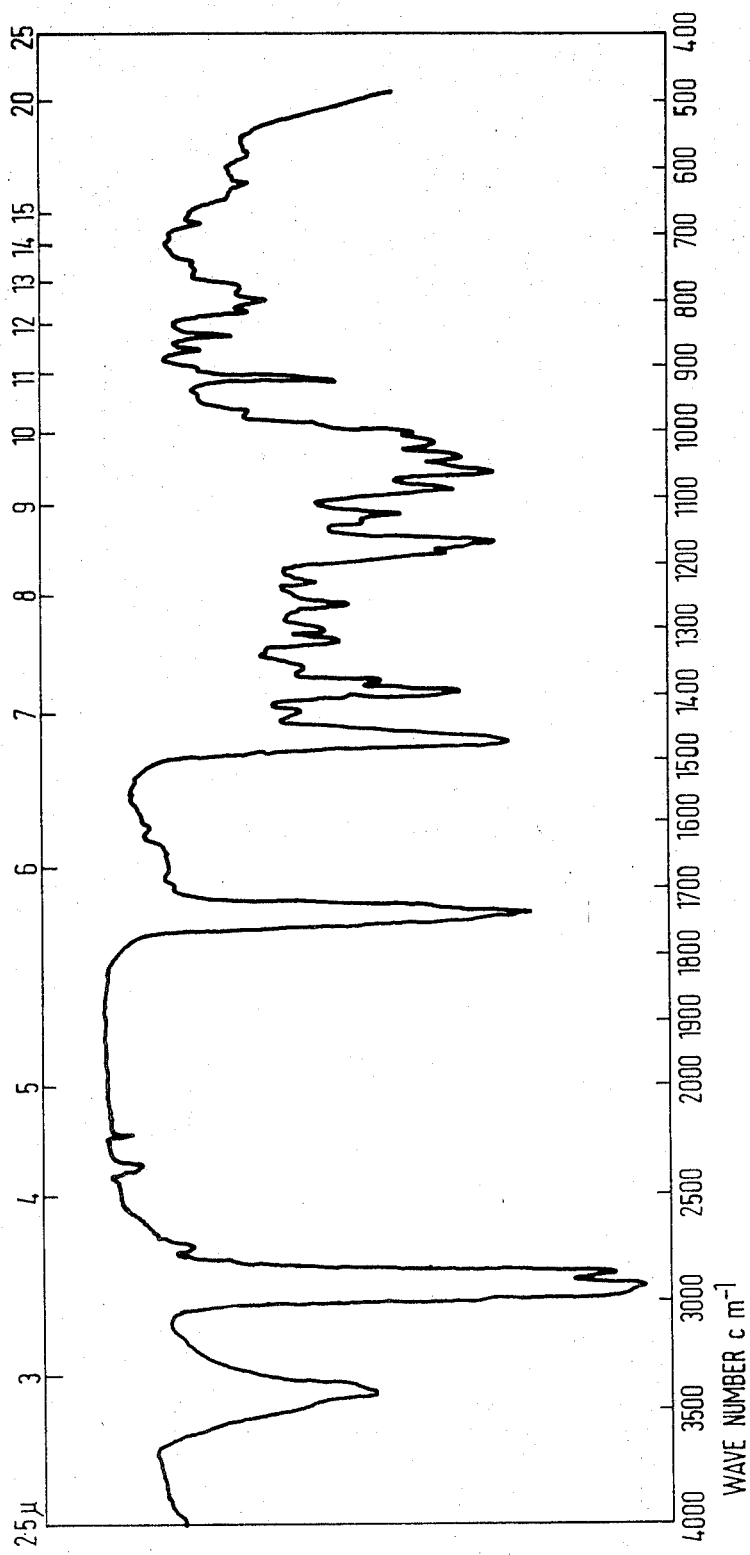
Figure 5:
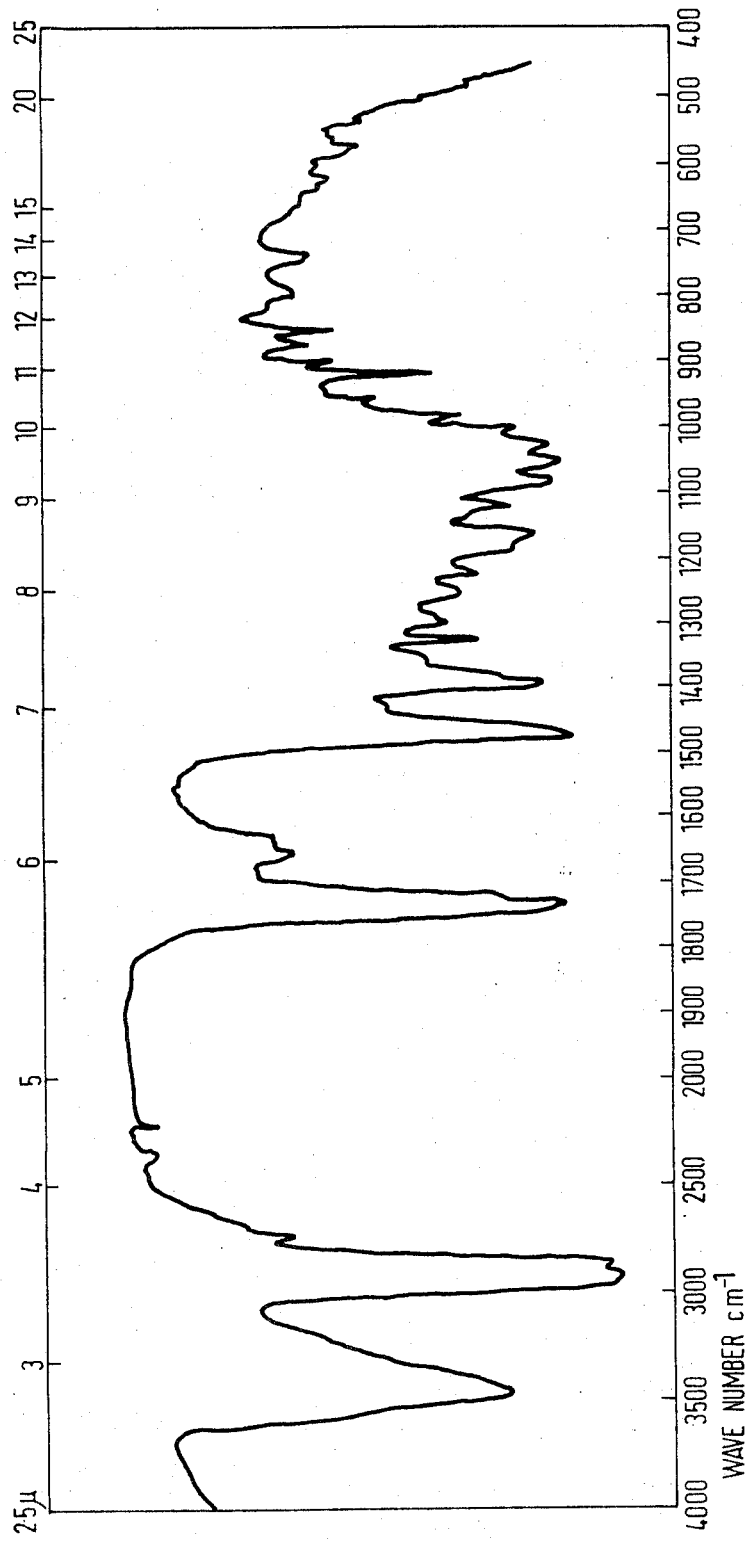

16. The antibiotic, YL 704 $B_1$, particularly effective in inhibiting the growth of gram-positive bacteria, said antibiotic being white needles having the following properties: an alkylene pH, a melting point of 131 to 132° C. and a specific rotation of $[\alpha]_D^{21}$ —43.1° (c.=1, chloroform); said antibiotic contains the elements of carbon, hydrogen, nitrogen and oxygen in substantially the following proportions by weight:

| | Percent |
|---|---|
| Carbon | 60.9 |
| Hydrogen | 8.3 |
| Nitrogen | 1.7 |
| Oxygen | 29.2 | and has a molecular weight of about 805 or 835 (in vapor pressure osmometric method in chloroform); the antibiotic has an infrared absorption spectrum as shown in FIG. 4 and an ultraviolet absorption spectrum as shown in FIG. 8, the antibiotic gives a positive ferric hydroxamate reaction and negative Tollens, Fehling, Molish, Ninhydrin, biuret and ferric chloride reactions; the antibiotic fades the color of an aqueous bromine solution and of an aqueous potassium permanganese solution, turning into a reddish violet color in concentrated sulfuric acid, and turning into a tartar color in concentrated hydrochloric acid; the antibiotic is highly soluble in methanol, ethanol, butanol, methylacetate, butylacetate, chloroform, acetone, ethylether and benzene, is slightly soluble in water and insoluble in cyclohexane, n-hexane and petroleum ether; the antibiotic has a $pK_a$-value of 7.00 (in 50% ethanol) and an Rf-value of 0.53 [on a thin layer plate of silica gel (Kiesel Gel FG 254); Solvent: a mixture of 8 ml. of ethylacetate, 2 ml. of n-hexane and a drop of concentrated aqueous ammonia], an Rf-value of 0.47 [on a thin layer plate of silica gel (Kiesel Gel FG 254); Solvent: a mixture of 3 ml. of benzene and 2 ml. of acetone], and an Rf-value of 0.50 [on a thin layer plate of aluminum oxide-silica gel (Kiesel Gel FG 254) (4:1); Solvent: a mixture of 3 ml. of benzene and 2 ml. of acetone].

17. An acid addition salt of the basic substance of claim 16.

18. The antibiotic, YL 704 $B_2$, particularly effective in inhibiting the growth of gram-positive bacteria, said antibiotic being white needles having the following properties: an alkylene pH, a melting point of 129 to 132° C. and a specific rotation of $[\alpha]_D^{21}$ —42.0° (c.=1, chloroform); said antibiotic contains the elements of carbon, hydrogen, nitrogen and oxygen in substantially the following proportions by weight:

| | Percent |
|---|---|
| Carbon | 60.0 |
| Hydrogen | 8.2 |
| Nitrogen | 1.7 |
| Oxygen | 29.5 | and has a molecular weight of about 796 or 840 (in vapor pressure osmometric method in chloroform); the antibiotic has an infrared absorption spectrum as shown in FIG. 4 and an ultraviolet absorption spectrum as shown in FIGS. 7 and 9, the antibiotic gives a positive ferric hydroxamate reaction and negative Tollens, Fehling, Molish, Ninhydrin, biuret and ferric chloride reactions; the antibiotic fades the color of an aqueous bromine solution and an aqueous potassium permanganese solution, turning into a reddish violet color in concentrated sulfuric acid, and turning into a tartar color in concentrated hydrochloric acid; the antibiotic is highly soluble in methanol, ethanol, butanol, methylacetate, butylacetate, chloroform, acetone, ethylether, and benzene, slightly soluble in water and insoluble in cyclohexane, n-hexane and petroleum ether; the antibiotic has a $pK_a$-value of 6.90 and an Rf-value of 0.53 [on a thin layer plate of silica gel (Kiesel Gel FG 254); Solvent a mixture of 8 ml. of ethylacetate, 2 ml. of n-hexane and a drop of concentrated aqueous ammonia], an Rf-value of 0.41 [on a thin layer plate of silica gel (Kiesel Gel 254); Solvent: a mixture of 3 ml. of benzene and 2 ml. of acetone], and an Rf-value of 0.33 [on a thin layer plate of aluminum oxide-silica gel (Kiesel Gel FG 254) (4:1); Solvent: a mixture of 3 ml. of benzene and 2 ml. of acetone].

19. An acid addition salt of the basic substance of claim 18.

References Cited

Miller-Pfizer Handbook of Microbial Metabolites (1961), p. 584 (Item 1139).

SAM ROSEN, Primary Examiner

U.S. Cl. X.R.

424—120; 195—65